United States Patent
Xu et al.

(10) Patent No.: US 9,811,665 B1
(45) Date of Patent: Nov. 7, 2017

(54) STATIC AND DYNAMIC SECURITY ANALYSIS OF APPS FOR MOBILE DEVICES

(71) Applicant: Palo Alto Networks, Inc., Santa Clara, CA (US)

(72) Inventors: Zhi Xu, San Jose, CA (US); Xinran Wang, San Ramon, CA (US); Huagang Xie, Pleasanton, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 768 days.

(21) Appl. No.: 13/954,815

(22) Filed: Jul. 30, 2013

(51) Int. Cl.
G06F 21/56 (2013.01)

(52) U.S. Cl.
CPC .................................. *G06F 21/566* (2013.01)

(58) Field of Classification Search
CPC ........ G06F 21/50; G06F 21/52–21/556; G06F 21/56–21/567; G06F 21/577
See application file for complete search history.

(56) References Cited

U.S. PATENT DOCUMENTS

| | | | | |
|---|---|---|---|---|
| 8,402,529 | B1 * | 3/2013 | Green | H04L 63/1416 726/11 |
| 8,863,288 | B1 * | 10/2014 | Savage | G06F 21/567 713/188 |
| 9,213,838 | B2 * | 12/2015 | Lu | G06F 21/563 |
| 2010/0333168 | A1 | 12/2010 | Herrod | |
| 2012/0079596 | A1 * | 3/2012 | Thomas | G06F 21/55 726/24 |
| 2012/0110174 | A1 | 5/2012 | Wootton et al. | |
| 2012/0240183 | A1 | 9/2012 | Sinha et al. | |
| 2013/0007245 | A1 | 1/2013 | Malik et al. | |
| 2013/0122861 | A1 * | 5/2013 | Kim | G06F 21/51 455/410 |

OTHER PUBLICATIONS

Min et al, Runtime-based Behavior Dynamic Analysis System for Android Malware Detection, Atlantis Press, ICCIA 2012, Dec. 2012.*
Rastogi et al., AppsPlayground: Automatic Security Analysis of Smartphone Applications, ACM, Feb. 2013.*
Zhou et al., Dissecting Android Malware: Characterization and Evolution, IEEE, 2012.*
Blasing et al. "An android application sandbox system for suspicious software detection." Malicious and Unwanted Software (MALWARE), 2010 5th International Conference on. IEEE, 2010.
Spreitzenbarth et al., "Mobile-Sandbox: Having a Deeper Look into Android Applications", from Proceedings of the 28th Annual ACM Symposium on Applied Computing, pp. 1808-1815, Mar. 2013.

* cited by examiner

*Primary Examiner* — Minh Dinh
(74) *Attorney, Agent, or Firm* — Van Pelt, Yi & James LLP

(57) ABSTRACT

Techniques for performing static and dynamic analysis on a mobile device application are disclosed. Static analysis is performed on a mobile device application using a static analysis engine. A static analysis report is generated. Dynamic analysis of the application is performed using a dynamic analysis engine. The dynamic analysis performed is customized based on results of the static analysis. A determination of whether the application is malicious is made based at least on the dynamic analysis.

20 Claims, 4 Drawing Sheets

STATIC AND DYNAMIC SECURITY ANALYSIS OF APPS FOR MOBILE DEVICES

BACKGROUND OF THE INVENTION

Individuals are increasingly spending more time using mobile devices and less time using traditional computers. This shift in usage is present both in personal and in business contexts. For example, employees of companies are increasingly using mobile devices for their work related activities. In conjunction with this shift in user behavior, nefarious individuals and organizations are increasingly targeting mobile devices with malicious applications ("malware"). Unfortunately, it can be difficult to protect mobile devices using existing techniques.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
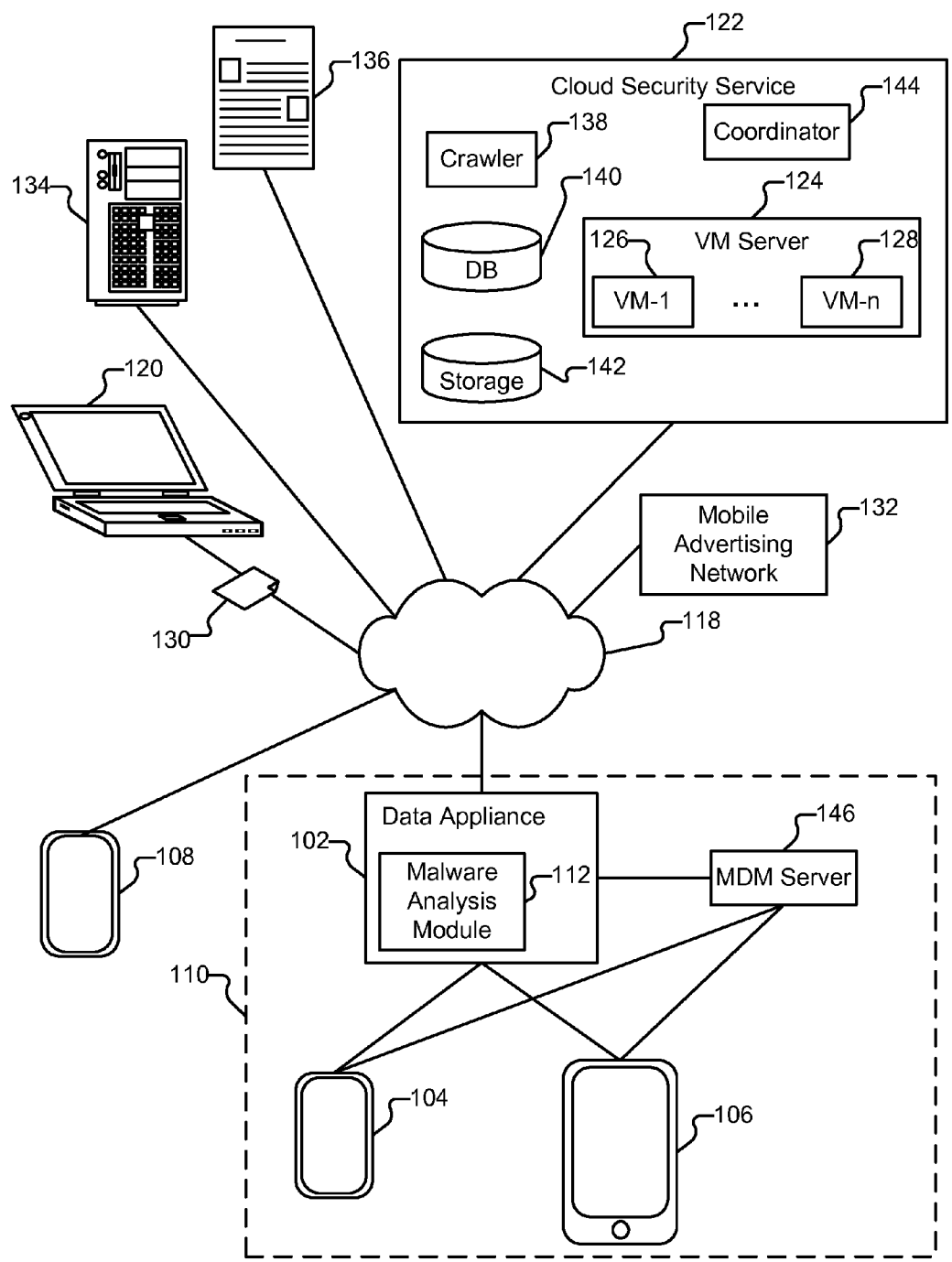
FIG. 1 illustrates an example of an environment in which mobile malware is detected and prevented from causing harm.

FIG. 1 illustrates an example of an environment in which malicious mobile applications (malware) are detected and prevented from causing harm. The term "application" is used throughout the Specification to collectively refer to programs, bundles of programs, manifests, packages, etc., irrespective of form/platform. Further, "malware" as used herein refers to an "application" that engages in behaviors, whether clandestinely or not, of which a user does not approve/would not approve if fully informed (whether illegal or not). Examples of malware include viruses, rootkits, spyware, keyloggers, spyware, etc. One particular example of mobile malware is a malicious .apk file that appears to an end user to be a free game, but stealthily sends SMS premium messages (e.g., costing $10 each), running up the end user's phone bill. Another example of mobile malware is an application that stealthily collects the user's contacts and sends them to a spammer. Yet another example of mobile malware is an application that collects and reports to a remote server the end user's location (but does not offer a location based service to the user, such as a mapping service). Other forms of mobile malware can also be detected/thwarted using the techniques described herein.

Suppose a nefarious individual wishes to propagate mobile malware (such as malware 130) via system 120 to end users. A variety of approaches can be used by the nefarious individual. As one example, the individual can upload mobile malware 130 to a software distribution platform such as platform 134 (also referred to as an "an app store"). The nefarious individual hopes that unsuspecting users of platform 134 (e.g., any of applicable client devices 104-108) will download the malicious application 130 from platform 134 and install it on their devices. Example embodiments of platform 134 include Google Play, the iOS App Store, BlackBerry World, the Windows Phone Store, and the Amazon Appstore. Additional examples of software distribution platforms include third party software distribution platforms, such as the Baidu App Store, GetJar, and Handango. Another way the nefarious individual can attempt to propagate mobile malware is by posting it on a message/forum site, such as site 136. In this scenario, the nefarious individual again hopes that unsuspecting users of site 136 will download and install the malicious application 130. Yet another way for the nefarious individual to attempt to propagate mobile malware 130 is to attach it to an email message and hope that the recipient (e.g., the owner of device 104) will open the attachment and install the program. Yet another way for the nefarious individual to attempt to propagate mobile malware 130 is to include it in an advertising company's ad network (e.g., mobile ad network 132) and hope that the user will install the promoted program.

In the example shown in FIG. 1, client devices 104-106 are a smartphone and a tablet (respectively) present in an enterprise network 110. Client device 108 is outside enterprise network 110. As shown, client device 104 runs an Android-based operating system, and client device 106 runs a version of iOS. Client device 108 is a smartphone that runs Windows Mobile OS. Each of the devices shown can be protected using techniques described herein. Other devices running other mobile operating systems can also be protected using the techniques described herein.

Data appliance 102 is configured to enforce policies regarding communications between clients such as clients 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website downloads, files exchanged through instant messaging programs, and/or other file transfers. In some embodiments, appliance 102 is also configured to enforce policies with respect to traffic that stays within enterprise network 110. In some embodiments, other devices are included in network 110, such as a mobile device management (MDM) server 146, which is in communication with data appliance 102. As shown, MDM server 146 communicates with mobile devices (e.g., 104, 106) to determine device status and to report (e.g., periodically) such mobile device status information to data appliance 102. MDM can be configured to report the presence of malicious applications installed on devices such as device 104/106, and/or can be configured to receive indications of which mobile applications are malicious (e.g., from appliance 102, from service 122, or combinations thereof). In some embodiments, data appliance 102 is configured to enforce polices against devices 104 and 106 based on information received from MDM server 146. For example, if device 106 is determined to have malware installed on it, data appliance 102 (working in cooperation with MDM server 146) can deny client 106 access to certain enterprise resources (e.g., an Intranet) while allowing device 104 (which does not have malware installed upon it) access to the resources.

Figure 2:
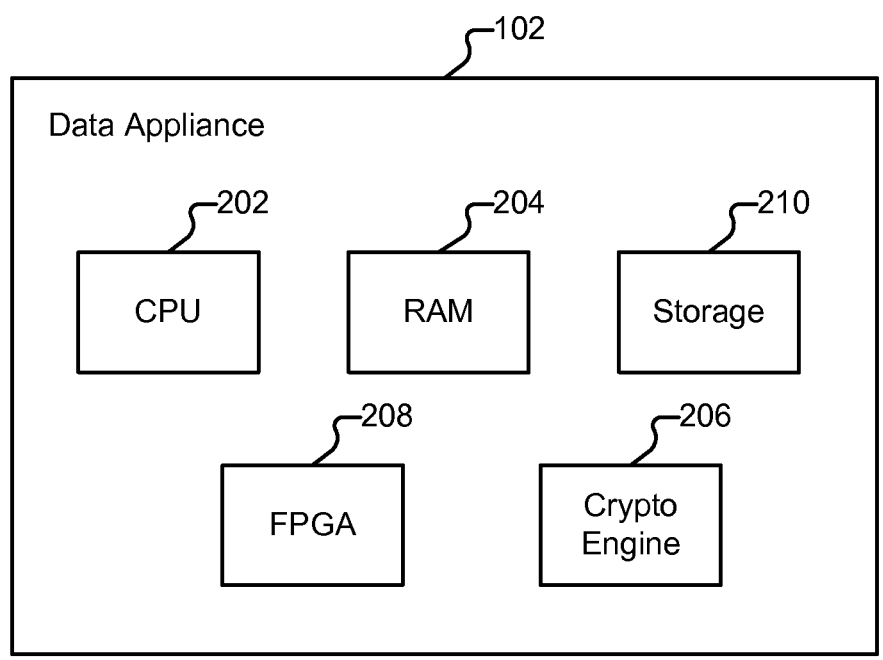
FIG. 2 illustrates an embodiment of a data appliance.

An embodiment of a data appliance is shown in FIG. 2. The example shown is a representation of physical components that are included in appliance 102, in some embodiments. Specifically, appliance 102 includes a high performance multi-core CPU 202 and RAM 204. Appliance 102 also includes a storage 210 (such as one or more hard disks), which is used to store policy and other configuration information, as well as URL information. Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Appliance 102 can take a variety of forms. For example, appliance 102 can be a single, dedicated device (e.g., as shown), and can also be a set of devices. The functionality provided by appliance 102 can also be integrated into or executed as software on a general purpose computer, a computer server, a gateway, and/or a network/routing device. For example, in some embodiments, services provided by data appliance 102 are instead (or in addition) provided to client 104 (or client 106) by an agent or other software executing at least partially on client 104 (or client 106).

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to system 102 as applicable.

Suppose data appliance 102 intercepts an email sent by system 120 to device 104 to which a copy of malware 130 has been attached. (As an alternate, but similar scenario, data appliance 102 could intercept an attempted download by device 104 of malware 130 from platform 134 or site 136). Data appliance 102 determines whether a signature for the attachment (i.e., malware 130) is present on data appliance 102. A signature, if present, can indicate that the attachment is known to be safe, and can also indicate that the attachment is known to be malicious. If no signature for the attachment is found, in some embodiments, data appliance 102 is configured to provide the attachment (malware 130) to a mobile malware analysis module 112 for real-time analysis. As will be described in more detail below, a combination of static and dynamic analysis can be performed on the application to determine whether it is malicious.

As mentioned above, the analysis of malware 130 can be performed on premise. For example, the analysis can be performed by a malware analysis module 112 included in data appliance 102. Instead of or in addition to on-premise analysis, appliance 102 can also send a copy of malware 130 to cloud security service 122 for analysis. Further, cloud security service 122 can also (or instead) obtain copies of mobile applications for evaluation from sources other than data appliance 102. As one example, cloud security service 122 can include a crawler 138 configured to periodically crawl platform 134 and/or site 136, looking for new or updated applications. Such applications (an example of which is malware 130) can then be analyzed by cloud security service 122. In some embodiments, platform 134 and/or site 136 make copies of applications available to cloud security service 122 via an Application Programming Interface (API) made available by service 122, instead of or in addition to crawler 138 obtaining such copies.

Copies of received applications (i.e., awaiting analysis) are stored in storage 142 and analysis is commenced (or scheduled, as applicable). As will be described in more detail below, results of the analysis (and additional information pertaining to the applications) are stored in database 140. Cloud security service 122 can comprise one or more dedicated commercially available hardware servers (e.g., having multi-core processor(s), 8 G+ of RAM, gigabit network interface adaptor(s), and hard drive(s)) running typical server-class operating systems (e.g., Linux). In various embodiments, service 122 is implemented across a scalable infrastructure comprising multiple such servers, solid state drives, and/or other applicable high-performance hardware. Cloud security service 122 can comprise several distributed components, including components provided by one or more third parties. For example, portions or all of cloud security service 122 can be implemented using the Amazon Elastic Compute Cloud (EC2) and/or Amazon Simple Storage Service (S3). Further, as with data appliance 102, when cloud security service 122 is referred to as performing a task, such as storing data or processing data, it is to be understood that a sub-component or multiple sub-components of cloud security service 122 (whether individually or in cooperation with third party components) may cooperate to perform that task. As one example, cloud security service 122 can optionally perform its analysis in cooperation with one or more virtual machine (VM) servers, such as VM server 124.

An example of a virtual machine server is a physical machine comprising commercially available server-class hardware (e.g., a multi-core processor, 4+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers cloud security service 122, but may also be provided by a third party. As one example, the virtual machine server can rely on EC2, with the remainder portions of cloud security service 122 provided by dedicated hardware owned by and under the control of the operator of cloud security service 122. As will be explained in more detail below, virtual machine server 124 is configured to provide one or more virtual machines 126-128 for emulating mobile devices. The virtual machines can execute a variety of operating systems and/or versions thereof. Observed behaviors resulting from executing mobile applications in the virtual machines are logged and analyzed for indications that the application is malicious. In some embodiments the log analysis is performed by the VM server (e.g., VM server 124). In other embodiments, the analysis is performed at least in part by other components of service 122, such as coordinator 144.

In some embodiments, cloud security service 122 makes available the results of its analysis of mobile applications via a list of signatures (and/or other identifiers) to appliance 102 (and/or to MDM server 146) as part of a subscription. For example, service 122 can send a content package that identifies malware apps periodically (e.g., daily, hourly, or some other interval, and/or based on an event based on a policy). An example content package includes a listing of identified malware apps (e.g., information in the content package can include an app package name, an app hash code for uniquely identifying the app, and a malware name for each identified malware app). The subscription can cover the analysis of just those files intercepted by data appliance 102 and sent to cloud security service 122 by data appliance 102, and can also cover signatures of all malware known to cloud security service 122 (or subsets thereof, such as just mobile malware but not other forms of malware (e.g., PDF malware)). Further, in some embodiments, cloud security service 122 is configured to provide security services to entities in addition to or instead of an operator of data appliance 102. For example, a carrier providing cellular service to device 108 can contract with cloud security service 122 to analyze applications which device 108 attempts to download. As another example, the owner of device 108 can contract with cloud security service 122 to analyze applications. As yet another example, an operator of app store 134, and/or an operator of site 136 can contract with cloud security service 122 to analyze mobile applications (e.g., for a fee).

In the event malware 130 is determined to be malicious (whether by cloud security service 122 or by data appliance 102), appliance 102 can be configured to automatically block the file download based on the analysis result. Further, a signature can be generated for malware 130 and distributed (e.g., to other data appliances) to automatically block future file transfer requests to download the file determined to be malicious.

Analyzing Mobile Applications

Figure 3:
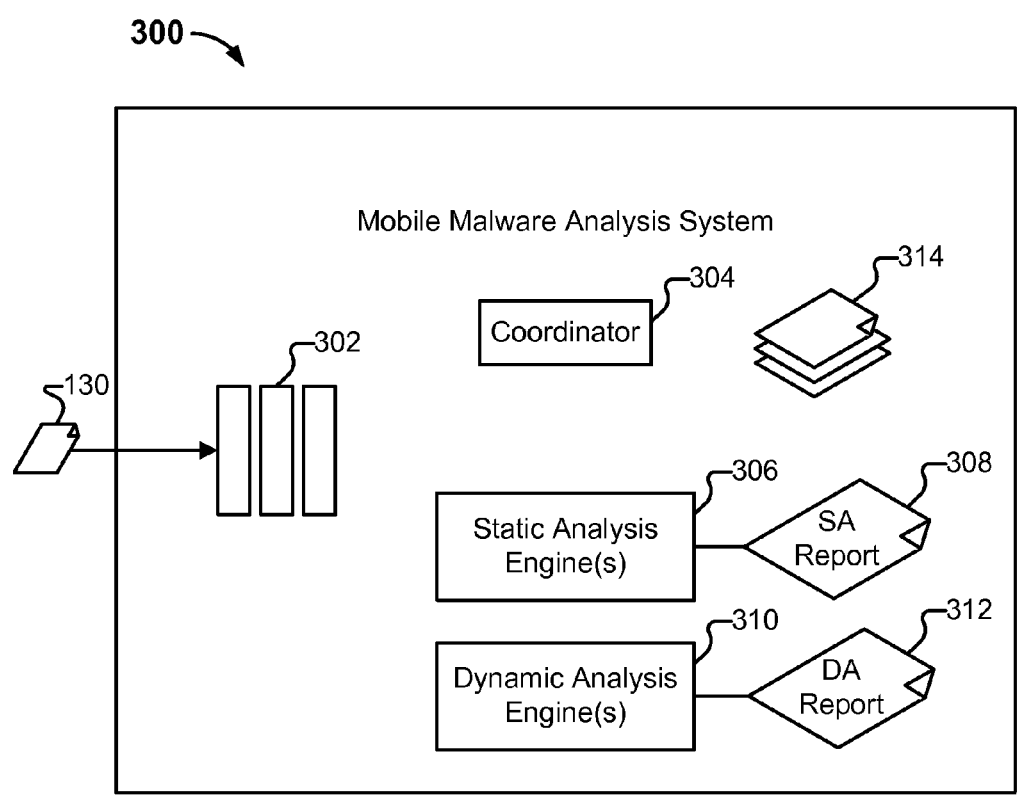
FIG. 3 illustrates an example of logical components included in a system for performing static and dynamic analysis on a mobile device application.

FIG. 3 illustrates an example of logical components included in a system for performing static and dynamic analysis on a mobile device application. As explained above, system 300 can be implemented using a single device. For example, the functionality of system 300 can be implemented on data appliance 102 which includes an analysis module 112. System 300 can also be implemented, collectively, across multiple distinct devices. For example, the functionality of system 300 can be provided by cloud security service 122.

As will be described in more detail below, system 300 is configured to perform a hybrid, two part analysis on mobile device applications. First, static analysis is performed, in part to check the capabilities of the application (e.g., its potential avenues for being malicious). Then, dynamic analysis is performed to check whether the application actually uses the capabilities maliciously. The hybrid approach helps improve the accuracy of mobile malware detection, while lowering the false positive rate of mislabeling benign application files as malware (e.g., due to harmless but poor programming techniques on the part of the application's author). A final verdict pertinent to the application can be made based on both the application's content (e.g., where the application includes a URL verified to be a malicious website), and on the context in which it behaves (e.g., whether the usage of a suspicious capability is made aware to an end user or is performed silently in the background).

In various embodiments, system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or service 122). Examples of information included in collection 314 are: URLs of known malicious websites; URLs of known safe websites; signatures, hashes, and/or other identifiers of known malicious applications; and signatures, hashes, and/or other identifiers of known safe applications; and signatures, hashes, and/or other identifiers of known malicious files (e.g. Android exploits files).

Ingestion

In some embodiments, when a new mobile application is received for analysis (e.g., an existing signature associated with the mobile application is not present in system 300), it is added to processing queue 302. In the following example, suppose the application is called "game.apk," (the malicious game 130) but that it is not yet known whether or not the game is malicious. As explained above, a mobile application for analysis can be received in a variety of ways. As one example, a mobile application can be received by data appliance 102 for analysis when data appliance 102 intercepts an email or other data transmission intended for device 104 that includes the application. Additional examples of the receipt of a mobile application include: (1) receipt by service 122 of the application from data appliance 102, platform 134, or site 136 for analysis (e.g., via an API), and (2) crawling by service 122 of systems such as platform 134 or site 136.

Static Analysis

Coordinator 304 monitors the queue, and as resources (e.g., a static analysis worker) become available, coordinator 304 fetches an application from queue 302 for processing (e.g., fetches game.apk). In particular, coordinator 304 first provides the application to static analysis engine 306 for static analysis. In some embodiments, one or more static analysis engines are included within system 300, where system 300 is a single device. In other embodiments, static analysis is performed by a separate static analysis server that includes a plurality of workers (i.e., a plurality of instances of static analysis engine 306).

One example of how static analysis can be performed, using game.apk (an Android application) as an example is as follows. Similar approaches can be used for mobile applications on other platforms. First, the static analysis engine 306 uses a tool, such as Android apktool, to reverse game.apk into an intermediate source code form. The output of the reversing operation is, in some embodiments, a set of .smali files—the direct output of the disassembly from Java virtual machine language, and other resources files included in the game.apk file.

The static analysis engine obtains general information about the application, and includes it (along with heuristic information described below) in a static analysis report 308. The report can be created by the static analysis engine, or by coordinator 304 (or by another appropriate component) which can be configured to receive the information from static analysis engine 306. In some embodiments, the collected information is stored in a database record for the application (e.g., in database 140), instead of or in addition to a separate report 308 being created (i.e., portions of the database record form the report 308). Examples of collected information include: the package name, shared UID, APK file signer information, permissions claimed, and sensitive API calls included in the source (e.g., sending or erasing SMS messages, accessing the phonebook, and tracking user location changes). The static analysis engine also collects and stores information pertaining to the running context of the application, such as: the minimum version of the Android OS required to run the application (the minimum SDK version), and the sensors it will have access to.

The static analysis engine also retrieves (e.g., from database 140) a set of heuristic rules to be applied on the .smali code and the resource files. In particular, static analysis engine 306 determines which rules are triggered (also referred to as "features hit") by the source code. Examples of features include the following (where an example of "the received APK" is "game.apk"):

1. "Contain APK file": If the received APK contains other APK files within the package, the received APK is suspicious.

2. "Contain Know Malicious APK File": If there exist other APK files within the package, those included APK files are analyzed separately (e.g., are added to the queue or checked with existing known malicious applications). If any of the included APK files are determined to malicious, the received APK is considered malicious as well.

3. "Hide Menu Icons": The menu icons are graphical elements placed in the options menu. If the received APK does not have the menu icons or attempt to hide the menu icons, it is suspicious.

4. "File Type Mismatch": If the received APK contains files whose formats do not match their extensions, it is highly suspicious (of maliciousness). For example, several Android malware families (e.g., Android.Droiddream family) attempt hide additional included APK files as database files by naming them with the ".db" extension rather than ".apk." As another example, a file labeled a ".png" may instead be an ".xml" file used for a command and control channel. As explained below, a developer may inadvertently misname a file (or otherwise misname a file without malicious intent).

5. "Contain Executable Files": If the received APK contains executables for the Linux platform (e.g. the .elf files), it is suspicious.

6. "Contain Malicious Executable Files": If the included executable files are known malicious files, e.g. known exploit libraries, the received APK is malicious.

7. "Install Other APK": If the received APK has the capacity of installing other APK files (e.g., while running in the background), it is suspicious.

8. "Uninstall Other APK": If the received APK has the capacity of uninstalling other APK files (e.g., while running in the background), it is suspicious.

9. "Contain Dangerous Shell Commands": If the received APK contains dangerous shell commands, e.g. chmod and su, it is malicious.

10. "Require Abnormal Permissions": If the received APK requires permissions such as "system debug," or "authenticate accounts," and/or factory adjustments such as setting process limits, it is suspicious.

11. "Contain Phone number": If the received APK contains phone number(s), it is suspicious (e.g., because the application may place calls or text messages to premium numbers).

12. "Contain URLs": If the received APK contains URL(s) within the source code, it is suspicious.

13. "Contain Malicious URL": Any URL(s) found are compared against a list of known malicious sites. If the URL(s) link to malicious site(s), the received APK is malicious.

14. "Send SMS": If the APK has the permission to send SMS messages, it is suspicious.

15. "Contain Autorun.inf file": If the received APK contains an autorun.inf file that is for Windows platform, it is malicious (e.g., because an attempt will be made by the user's computer to execute the file if the user connects the phone to the computer).

16. "Duplicate Entries": If the APK has duplicate entry names (e.g. containing two classes.dex files in the same folder within the APK) in the file, it is malicious. (E.g., because it is attempting to exploit the Android security vulnerability #8219321.

The static analysis engine stores the results of the rule testing a database (e.g., database 140) in the record associated with the application being tested (and/or includes the results in report 308 as applicable). In some embodiments, the static analysis engine also forms a verdict with respect to the application (e.g., "safe," "suspicious," or "malicious"). As one example, the verdict can be "malicious" if even one "malicious" static feature is present in the application. As another example, points can be assigned to each of the features (e.g., based on severity if found; based on how reliable the feature is for predicting malice; etc.) and a verdict can be assigned by static analysis engine 306 (or the coordinator, if applicable) based on the number of points associated with the static analysis results.

In some cases, an application may appear "suspicious" to static analysis engine 306 due to poor programming choices made by a harmless programmer, rather than a malicious one. As one example, the programmer may have named an executable that handles playing of an MP3 file with a ".mp3" extension. This sort of filetype mismatch (i.e., that an executable is incorrectly labeled with a non-executable extension) could indicate malicious behavior (i.e., a malicious individual is trying to hide a malicious executable through misnaming the filename). Here, however, the file was inadvertently mislabeled. Static analysis engine 306 notes (e.g., with rule "File Type Mismatch" being included in the static analysis report) that there is a "suspicious" aspect to the file which warrants additional investigation during dynamic analysis to reach a conclusion as to whether the application is benign or malicious.

In some embodiments, static analysis engine 306 will conclude that the application will crash (and/or cause the virtual machine to crash) if executed. As one example, static analysis engine 306 can perform integrity checking and determine that a file is missing, corrupted, unsigned, etc. In this scenario, dynamic analysis can be skipped (e.g., with static analysis noting in report 308 that the application will crash if an attempt is made to install/execute it).

Dynamic Analysis

Once the static analysis is complete, coordinator 304 locates an available dynamic analysis engine 310 to perform dynamic analysis on the application. As with static analysis engine 306, system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a mobile device emulator (e.g., running in a virtual machine). Results of the static analysis (e.g., performed by static analysis engine 306), whether in report form (308) and/or as stored in database 140, or otherwise stored are provided as input to dynamic analysis engine 310. The static report information is used to help customize the type of dynamic analysis performed by dynamic analysis engine 310, conserving resources and/or shortening the time required to evaluate an application. As one example, if static analysis has concluded that the application does not have the ability to access SMS messages, during dynamic analysis, the receipt of SMS messages will not be simulated in some embodiments. As another example, if static analysis has concluded that the application has the ability to access GPS information, during dynamic analysis, various changes in location of the device will be simulated. However, if the application lacks the ability to access GPS information, in some embodiments no location changes will be simulated (reducing the amount of time/computing resources needed to complete dynamic analysis). As yet another example, dynamic analysis engine 310 will determine which emulator(s) to run based on the minimum operating system version number required by the application (and determined during static analysis). If the minimum version number is Android 4.0, dynamic analysis engine 310 will launch an Android emulator having that version number (and, in some embodiments, will not attempt to emulate a lower version of Android). If the minimum version number is Android 2.3, multiple emulators can be used to evaluate the application (e.g., Android 2.3, and any higher versioned emulators, such as Android 4.0). Where multiple emulators are used, a single dynamic analysis engine can manage all of the emulators (whether in sequence or in parallel), or multiple dynamic analysis engines can be used (e.g., with each managing its own emulator), as applicable.

The dynamic analysis engine/worker begins analysis by preparing and setting up the running environment for the application to be tested. Examples of operations carried out by the dynamic analysis engine/worker at this point include: (1) determining which system services should be started (e.g., simulated motion sensor readings and simulated location changes); and (2) determining what set of simulated user operations should take place (e.g., performed after installation, in sequence).

The dynamic analysis engine/worker loads an appropriate emulator (e.g., Android version 2.3) and installs the application to be analyzed. The emulators used by mobile malware analysis system 300 are instrumented. For example, they are configured to log activities as they occur in the emulator (e.g., using a customized kernel that supports hooking and logcat). Further, network traffic associated with the emulator is captured (e.g., using pcap).

The application is executed and various applicable actions (e.g., selected based on static analysis report 308) are performed (e.g., by the dynamic analyzer executing commands via an Android Debug Bridge ("adb") connection and/or through the use of a service coordinator included in the modified emulator and configured to orchestrate the simulation of user events such as button presses as commanded by the dynamic analysis engine). As one example, if the application was determined during static analysis to have access to location information, changes in location will be simulated in the emulator and any resulting behaviors logged. In some embodiments the log data is stored as a temporary file on system 300.

In some embodiments, dynamic analysis is performed in two stages. In particular, after the application has been installed and executed (with associated simulated information/events) and a first log file is created (e.g., "logcat1.txt"), a reboot of the emulator is performed and the application is launched and interacted with again, resulting in a second log file (e.g., "logcat2.txt"). Dynamic analysis engine 310 evaluates both log files, along with any network traffic captured during the two stages (e.g., using pcap).

Examples of features that can be detected during dynamic analysis include the following (where an example of "the received APK" is again "game.apk"):

1. "Connect To Unknown Websites": If the received APK attempts to connect to an unknown website (e.g., one that is not on a whitelist of known safe websites), it is suspicious.

2. "Connect To Malicious Websites": If the received APK attempts to connect to a known malicious websites, it is malicious.

3. "Add Malicious Bookmarks": If the received APK attempts to add a known malicious website to the bookmarks of a browser, it is malicious.

4. "Install Other APK": If the received APK attempts to install other APK files, it is malicious. The APK to be installed can either be included within the original (received) APK file, or downloaded by the received APK from a remote server.

5. "Uninstall Other APK": If the received APK attempts to uninstall other installed apps, it is malicious.

6. "Uninstall Itself": If the received APK attempts to uninstall itself after installation, it is malicious.

7. "Send SMS In Background": If the received APK attempts to send SMS messages while running in the background, it is malicious.

8. "Insert SMS To Inbox": If the received APK attempts to insert an SMS message into the Inbox (e.g., while running in the background), it is malicious.

9. "Delete SMS from Inbox": If the received APK attempts to delete one or more SMS messages present in the Inbox, it is malicious.

10. "Send SMS To Contacts": If the received APK attempts to send multiple contacts automatically, it is malicious.

11. "Auto Reply SMS": If the received APK attempts to send an SMS upon receiving an SMS, it is malicious.

12. "Add APN Settings": If the received APK attempts to insert new APN settings, it is suspicious.

13. "Call Sensitive Service": If the received APK attempts to call sensitive system services or execute dangerous shell commands (e.g. the "mount" command), it is malicious.

14. "Load Malicious File": If the received APK loads one or more files when running, the loaded files will be checked separately. If the loaded files are malicious, then the received APK is malicious.

15. "Create APK Files": If the received APK attempts to save other APK files in one of the system folders (e.g., "/system/app" or "/data/app"), it is suspicious. The saved APK files will be checked separately.

16. "Create Malicious File": If the received APK attempts to create a file with a sensitive file type, such as .elf or autorun.inf, it is malicious.

17. "Access Hidden Folder Or Files": If the received APK attempts to create or access hidden folders or files on the local storage and outside its own local storage folder, it is malicious. An example of a hidden folder is "./.hidden/."

18. "Change File Permission": If the received APK attempts to change the default permissions of local files to "executable," and this file has not been checked in static analysis or has been checked as malicious in static analysis, it is malicious.

As with the static analysis engine, the dynamic analysis engine stores the results of the rule testing in the database in the record associated with the application being tested (and/or includes the results in report 312 as applicable). In some embodiments, the dynamic analysis engine also forms a verdict with respect to the application (e.g., safe, suspicious, or malicious). As one example, the verdict can be "malicious" if even one "malicious" dynamic feature is present in the application. As another example, points can be assigned to each of the features (e.g., based on severity if found; based on how reliable the feature is for predicting malice; etc.) and a verdict can be assigned by dynamic analysis engine 306 (or the coordinator, if applicable) based on the number of points associated with the static analysis results.

In some embodiments, a final verdict associated with the application is assessed (e.g., based on a combination of report 308 and report 312) by coordinator 304.

Example Process

Figure 4:
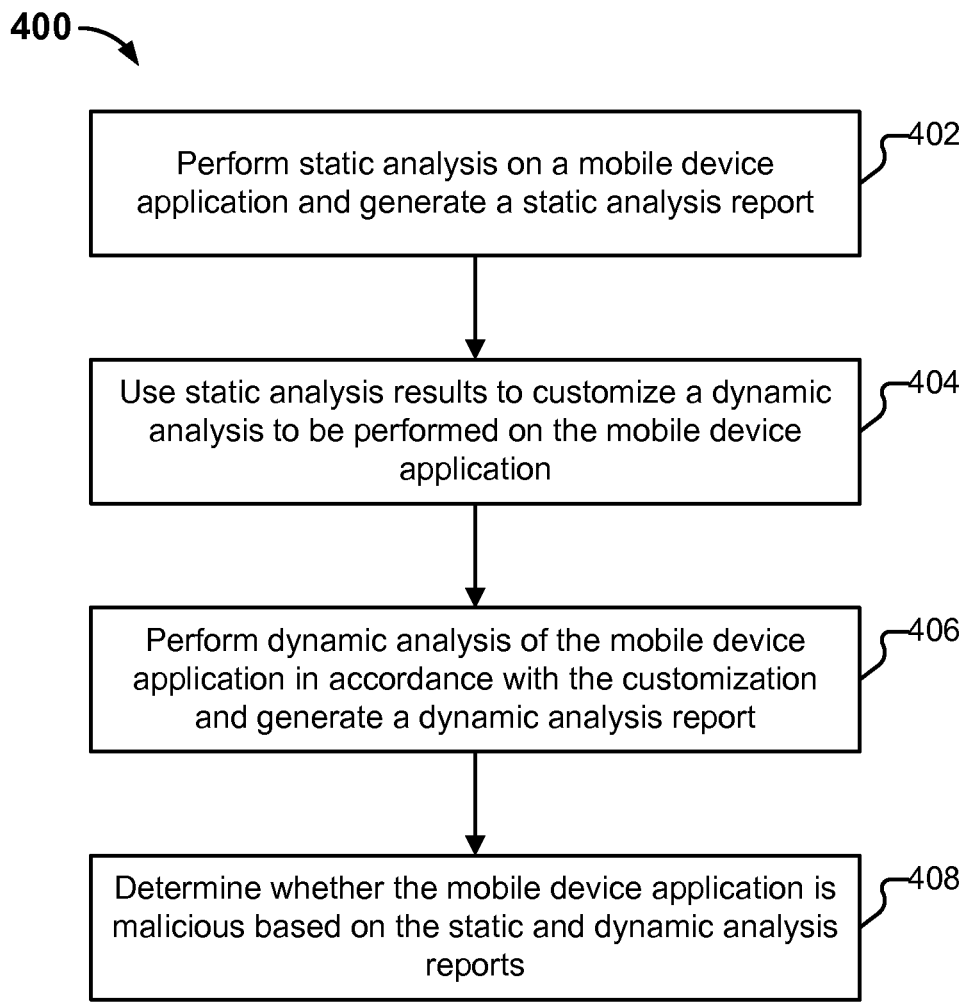
FIG. 4 illustrates an embodiment of a process for determining whether a mobile device application is malicious.

FIG. 4 illustrates an embodiment of a process for determining whether a mobile application is malicious. In various embodiments, process 400 is performed by mobile malware analysis system 300. The process begins at 402 when static analysis is performed on a mobile malware application. As one example, static analysis is performed on an application, such as "game.apk" by a static analysis engine 306 at 402. Suppose "game.apk" is malicious and will delete all of the SMSes in a user's Inbox if the device it is running on receives an SMS from ChinaMobile's service number (e.g. "10086"). The application does this to hide notifications pertaining to phone billing from the end user. During static analysis, a determination would be made that the game.apk application has access to SMS content. This capability of the application (along with other information, examples of which are provided above) is included in a static analysis report by the static analysis engine. At 404, the static analysis report is used to customize a dynamic analysis to be performed on the mobile device application. As one example, since the application has access to SMS content, the dynamic analysis will be customized to include sending a variety of SMS messages. Other device resources to which the application does not have access (e.g., GPS location information) will not be simulated and thus can be excluded from the customized dynamic analysis plan. At 406, dynamic analysis of the application is performed using a dynamic analysis engine. One example of the dynamic analysis performed includes sending SMSes appearing to originate from a variety of sources, including 10086 (i.e., the service number of ChinaMobile) to the emulator. Sending such an SMS is an example of an "external event" (as is a simulated location change)—contrasted with an "internal event" (e.g., where button presses or file opens/closes are simulated). When game.apk deletes the SMS Inbox upon receiving the simulated incoming SMS from ChinaMobile, the game.apk's actions will be captured and logged. The dynamic analysis engine will examine the logged behavior in conjunction with creating a dynamic analysis report—and determine that the application has taken a malicious action with respect to SMS messages. Finally, at 408 a determination is made as to whether the mobile device application is malicious, based on the static and dynamic analysis reports. In this example, coordinator 304 examines the static analysis report (concluding that the application is "suspicious") and dynamic analysis report (concluding the application is "malicious") and determines that game.apk is malicious.

In some cases, static analysis engine 306 might conclude an application is malicious, while dynamic analysis engine 310 might conclude the application is merely suspicious. In various embodiments, the final decision rendered by the mobile malware analysis system 300 uses the more severe of the two assessments (e.g., concluding the application is malicious based on the static analysis report). In various embodiments, the final verdict is determined by coordinator 304 assigning points to each of the features triggered by the application (i.e., both the static features and the dynamic features). If the score exceeds a threshold, the application is determined to be malicious. More sophisticated scoring rubrics can also be used in conjunction with the techniques described herein, such as ones which weight dynamic analysis results more heavily than static analysis results.

In some embodiments, coordinator 304 (or another appropriate component) is configured to revise one or more heuristics based on process 400. As one example, static analysis engine 306 might determine that a given application is configured to send an SMS message, but static analysis engine 306 is unable to determine whether the SMS is in fact malicious (e.g., to a 900 number). One reason static analysis engine 306 might not know that the SMS is malicious is because the number is encoded in a way not previously seen by system 300. Another reason static analysis engine 306 might not know the SMS is malicious is because the number is fetched from a URL included in the application (but not known to system 300 to be a malicious URL). During dynamic analysis of the application, a determination might be made that the number to which the SMS is sent is in fact malicious (e.g., by comparing log information against a collection 314 of malicious/premium numbers). The static analysis rules can be revised to indicate that, in the future, if the encoded information representing the 900 number is encountered in any new applications, those applications are malicious (rather than suspicious). As another example, collection 314 can be refined to include the URL as known malicious. When a future application is evaluated by static analysis engine 306 that includes the URL, the static analysis engine will conclude that the application is malicious (instead of suspicious) based on the presence of the URL in collection 314.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
a processor configured to:
perform static analysis on a mobile device application using a static analysis engine to generate a static analysis report associated with the application;

perform dynamic analysis of the application using a dynamic analysis engine, wherein the dynamic analysis is customized based on results of the static analysis, wherein performing dynamic analysis includes emulating a mobile device, wherein performing dynamic analysis includes simulating an event external to the mobile device, and wherein performing dynamic analysis includes: (1) performing a first stage of dynamic analysis, (2) initiating a reboot event, and (3) performing a second stage of dynamic analysis after the reboot event occurs; and determine whether the application is malicious based at least in part on the dynamic analysis; and a memory coupled to the processor and configured to provide the processor with instructions.

2. The system of claim 1 wherein the processor is further configured to refine a result of the static analysis based on the dynamic analysis.

3. The system of claim 1 wherein performing static analysis includes determining that a permission is not used by the application, and wherein customizing the dynamic analysis includes not performing dynamic analysis with respect to the permission.

4. The system of claim 1 wherein performing static analysis includes reversing the mobile device application into an intermediate source code form.

5. The system of claim 1 wherein performing static analysis includes determining the presence of a filetype mismatch.

6. The system of claim 1 wherein performing static analysis includes determining a minimum operating system version number associated with the application.

7. The system of claim 6 wherein performing dynamic analysis includes emulating a system running the minimum operating system version.

8. The system of claim 1 wherein performing static analysis includes performing an integrity check to determine whether the application will crash if executed during dynamic analysis.

9. The system of claim 1 wherein performing at least one of static and dynamic analysis includes determining that a deletion action is taken in response to receipt of message appearing to have been sent by a carrier.

10. The system of claim 1 wherein, in the event a feature is identified as suspicious during static analysis, the processor is configured to determine whether the feature is malicious during dynamic analysis.

11. The system of claim 1 wherein the processor is further configured to report the determination to a data security appliance.

12. The system of claim 1 wherein the simulated external event comprises a simulated location change.

13. The system of claim 1 wherein the simulated external event comprises a simulated transmission of a message to the mobile device from a simulated entity.

14. A method, comprising:
performing static analysis on a mobile device application using a static analysis engine to generate a static analysis report associated with the application;

performing dynamic analysis of the application using a dynamic analysis engine, wherein the dynamic analysis is customized based on results of the static analysis, wherein performing dynamic analysis includes emulating a mobile device, wherein performing dynamic analysis includes simulating an event external to the mobile device, and wherein performing dynamic analysis includes: (1) performing a first stage of dynamic analysis, (2) initiating a reboot event, and (3) performing a second stage of dynamic analysis after the reboot event occurs; and determining whether the application is malicious based at least in part on the dynamic analysis.

15. The method of claim 14 further comprising refining a result of the static analysis based on the dynamic analysis.

16. The method of claim 14 wherein performing static analysis includes determining that a permission is not used by the application, and wherein customizing the dynamic analysis includes not performing dynamic analysis with respect to the permission.

17. The method of claim 14 wherein performing static analysis includes determining a minimum operating system version number associated with the application.

18. The method of claim 14 wherein performing at least one of static and dynamic analysis includes determining that a deletion action is taken in response to receipt of message appearing to have been sent by a carrier.

19. The method of claim 14 wherein, in the event a feature is identified as suspicious during static analysis, a determination of whether the feature is malicious is made during dynamic analysis.

20. A computer program product embodied in a non-transitory computer readable storage medium and comprising computer instructions for:
performing static analysis on a mobile device application using a static analysis engine to generate a static analysis report associated with the application;

performing dynamic analysis of the application using a dynamic analysis engine, wherein the dynamic analysis is customized based on results of the static analysis, wherein performing dynamic analysis includes emulating a mobile device, wherein performing dynamic analysis includes simulating an event external to the mobile device, and wherein performing dynamic analysis includes: (1) performing a first stage of dynamic analysis, (2) initiating a reboot event, and (3) performing a second stage of dynamic analysis after the reboot event occurs; and determining whether the application is malicious based at least in part on the dynamic analysis.

* * * * *